United States Patent Office 2,947,785
Patented Aug. 2, 1960

2,947,785

CYCLIC PROCESS FOR THE PRODUCTION OF LOWER NITROSODIALKYLAMINES

John B. Tindall, Terre Haute, Ind., assignor to Commercial Solvents Corporation, Terre Haute, Ind., a corporation of Maryland No Drawing. Filed Dec. 4, 1957, Ser. No. 700,563

4 Claims. (Cl. 260—583)

My invention relates to the production of nitrosodialkylamines and more particularly, it relates to a cyclic process for the production of lower nitrosodialkylamines.

The most widely employed prior process for the preparation of lower nitrosodialkylamines is exemplified by the process described in Organic Synthesis, Col. vol. 2, John Wiley & Sons, Inc., New York (1943) page 211. The described process consists essentially of reacting dimethylamine and sodium nitrite in the presence of hydrochloric acid to produce nitrosodimethylamine, the reaction mixture being then distilled until the residue is dry. Water is then added to the residue and the process of the distillation to dryness repeated. The distillates are combined and saturated with potassium carbonate, the upper layer of nitrosodimethylamine removed and combined with ether extracts of the water layer and the mixture then dried and distilled to obtain nitrosodimethylamine as a yellow oil having a boiling point of about 149–150° C. (775 mm.). As is evident, this method is cumbersome and difficult to adapt to large scale commercial preparation of lower nitrosodialkylamines, products which are reduced to obtain unsymmetrical dialkylhydrazines.

I have now discovered an economic and convenient cyclic process for the production of lower nitrosodialkylamines which comprises continuously introducing an acid into a mixture of a lower alcohol and an alkali metal nitrite, forming lower alkyl nitrite vapors which are bubbled through a substantially anhydrous solution of dimethylamine and methanol, continuously removing part of the lower nitrosodialkylamine and a lower alkyl alcohol, corresponding to the alkyl radical of the nitrite, formed by the reaction, distilling the mixture to remove the lower alkyl alcohol which is then recycled to the alkyl nitrite generator, and recovering the essentially pure lower nitrosodialkylamine as a final product. The process of my invention is direct and capable of producing the desired product without the problem, inherent in the prior art process, of removing water from an azeotropic mixture of the nitrosodialkylamine and water as the reaction is carried out under substantially anhydrous conditions.

The nitrosodialkylamines which I can prepare by the process of my invention are the lower nitrosodialkylamines, such as nitrosodimethylamine, nitrosodiethylamine, nitrosodiisopropylamine, nitrosomethylethylamine, nitrosodibutylamine, etc. These nitroso compounds are prepared from the corresponding dialkylamines.

The alcohols which I used to form nitrites in my process are the lower monohydric alkyl alcohols such as methyl, ethyl, propyl, isopropyl, etc. I prefer to use methyl and ethyl alcohols as they form nitrites which are gaseous at atmospheric pressure and at normal room temperatures of about 20° C.

I have found that the process of my invention gives excellent yields at room temperature and at atmospheric pressure. I prefer to use this temperature and pressure due to the extreme simplicity of equipment design in such case. I can, however, obtain excellent yields at temperatures of 0–100° C. and under increased pressures.

I have found that the proportions of reactants are not critical and that I obtain excellent yields using equivalent amounts of reactants.

The following examples are offered to illustrate my invention; however, I do not intend to be limited to the specific proportions, or procedures described. Rather I intend to include within the scope of my invention all equivalents obvious to those skilled in the art.

Example I

To an initial charge of 70 grams of sodium nitrite, 45 mls. of methyl alcohol, and 45 mls. of water; 70 grams of sodium nitrite, 45 mls. of methanol, and 110 mls. of 45% sulfuric acid were added per hour. The methyl nitrite which continuously evolved from this reaction in the vapor phase was passed into the bottom of a reaction flask, maintained at 17–24° C. containing 245 mls. of a 3.40 N solution of dimethylamine in methanol. An equal amount of dimethylamine solution was added per hour as the reaction proceeded so that approximately 245 mls. of the dimethylamine solution was maintained in the reaction flask at all times. Dimethylamine and the reaction products nitrosodimethylamine and methanol were drawn off at the surface of the reaction mixture, and passed into a distillation column from which desired cuts were removed. Dimethylamine was recycled into the dimethylamine solution, methyl alcohol into the methyl nitrite generator, and nitrosodimethylamine was removed at the rate of 62.3 grams per hour. This product was found to be 99+% pure in yields of 99.4%, based on dimethylamine.

Example II

To an initial charge of 70 lbs. of sodium nitrite and 8 gallons of a 50% methanol solution contained in a glass lined reactor, 4 gallons of methanol, and 70 lbs. of sodium nitrite were added, together with 50 lbs. of sulfuric acid, per hour in order to generate a constant amount of methyl nitrite. Excess liquids were removed through a stand pipe which served as a level control in the methyl nitrite generator. The methyl nitrite vapors were passed into a 3 N solution of 45 lbs. of dimethylamine in methanol. Forty-five pounds of dimethylamine were added per hour and the reaction mixture was maintained at temperatures ranging from 15–25° C. A part of the reaction mixture was continuously removed so that there was approximately 45 gallons of reaction mixture present in the nitrosodimethylamine generator at all times. The crude reaction product was distilled to remove methanol which was returned to the methyl nitrite generator, small amounts of dimethylamine which were returned to the nitrosodimethylamine generator, and yield approximately 58 pounds per hour of 99% pure nitrosodimethylamine.

Example III

Substantially anhydrous methyl nitrite prepared by reacting 6.7 moles of sodium nitrite and an equimolar amount of hydrochloric acid was passed into a reactor containing a solution of 4 moles of diethylamine in 223 grams of methanol over a period of 12 hours. The reaction temperature was maintained at 25–26° C. at all times. After all of the methyl nitrite had been passed into the amine solution, the reaction mixture was refluxed to remove excess methyl nitrite and distilled. A fraction of 398 grams of nitrosodiethylamine was recovered at distillation of 70–72° (20 mm.) corresponding to a yield of 97.5%.

Example IV

Into a mixture of 219 grams of N-methylisopropylamine (purity, 98.7%) and 200 mls. of methanol, was passed the ethyl nitrite from the interaction of 4.2 moles of sodium nitrite and 4.2 moles of ethyl alcohol. A yield of 91.5% was recovered when the reaction mixture was distilled at 73° (20 mm.).

This application is a continuation-in-part of my now abandoned U.S. Serial No. 632,661, filed January 7, 1957.

Now having described my invention what I claim is:

1. A process for the production of lower nitrosodialkylamines which comprises interacting a lower alkyl nitrite with a lower dialkylamine under substantially anhydrous conditions at atmospheric pressure and at temperatures of 0–100° C.

2. A process for the production of lower nitrosodialkylamines which comprises forming vapors of lower alkyl nitrites and interacting these vapors with lower dialkylamines under substantially anhydrous conditions at atmospheric pressure and at temperatures of 0–100° C.

3. A process for the production of nitrosodimethylamine which comprises interacting methyl nitrite with dimethylamine under substantially anhydrous conditions at atmospheric pressure and at temperatures of 0–100° C., and recovering the nitrosodimethylamine.

4. A cyclic process for the production of lower nitrosodialkylamines which comprises forming an alkyl nitrite from nitrous acid and a lower alkyl monohydric alcohol, interacting the alkyl nitrite with a lower dialkylamine under substantially anhydrous conditions at atmospheric pressure and temperatures of 0–100° C. to form a lower nitrosodialkylamine and an alcohol, recovering the nitrosodialkylamine, and recycling the lower alkyl alcohol to the alkyl nitrite generator.

References Cited in the file of this patent

Taylor et al.: "Sidgwick's Organic Chemistry of Nitrogen," (1949) pages 3, 451, 453.

Karrer: "Organic Chemistry" (1950), pages 131, 132.

Brewster: "Organic Chemistry," Prentice-Hall Inc., N.Y., 2nd edition (1954), page 211.